United States Patent
Orchard

(10) Patent No.: US 12,116,793 B2
(45) Date of Patent: Oct. 15, 2024

(54) SCAFFOLDING SYSTEMS AND A SCAFFOLDING JOINT THEREFOR

(71) Applicant: SCAFFOLD SAFETY INNOVATIONS LTD, Middlesbrough (GB)

(72) Inventor: David John Orchard, Linthorpe Middlesbrough (GB)

(73) Assignee: SCAFFOLD SAFETY INNOVATIONS LTD (GB)

( * ) Notice: Subject to any disclaimer, the term of this patent is extended or adjusted under 35 U.S.C. 154(b) by 699 days.

(21) Appl. No.: 17/050,355

(22) PCT Filed: Apr. 25, 2019

(86) PCT No.: PCT/GB2019/000063
§ 371 (c)(1),
(2) Date: Oct. 23, 2020

(87) PCT Pub. No.: WO2019/207273
PCT Pub. Date: Oct. 31, 2019

(65) Prior Publication Data
US 2021/0047847 A1 Feb. 18, 2021

(30) Foreign Application Priority Data

Apr. 25, 2018 (GB) ...................... 1806789

(51) Int. Cl.
*E04G 7/14* (2006.01)
*A62B 35/00* (2006.01)
(Continued)

(52) U.S. Cl.
CPC ............ *E04G 7/14* (2013.01); *A62B 35/0068* (2013.01); *E04G 5/001* (2013.01); *F16B 45/00* (2013.01)

(58) Field of Classification Search
CPC .... E04G 7/12; E04G 7/14; E04G 7/16; E04G 5/0011; E04G 21/3276; E04G 5/001;
(Continued)

(56) References Cited

U.S. PATENT DOCUMENTS 3,810,704 A * 5/1974 Lowe ........................ E04G 7/14
403/385
4,632,221 A * 12/1986 Stanford ................... E04G 7/14
403/49
(Continued)

FOREIGN PATENT DOCUMENTS

DE 2753067 5/1979
DE 202015002356 4/2015
(Continued)

*Primary Examiner* — Brian D Mattei
*Assistant Examiner* — Jacob G Sweeney
(74) *Attorney, Agent, or Firm* — The Belles Group, P.C.

(57) ABSTRACT

A scaffolding assembly is disclosed. The system includes scaffolding poles joints (or fittings) for releasably securing the poles at cross-over points. Each scaffolding joints has an inner body member and two movable outer clamping members to clamp the poles to the body member at the cross-over points. The body member also has as a mounting for a safety connection member which projects laterally the scaffolding poles towards an operative. The safety connection member can be connected to a safety tension member from the operative such that a safety connection point is available at each of the scaffolding joints.

8 Claims, 5 Drawing Sheets

(51) Int. Cl.
*E04G 5/00* (2006.01)
*F16B 45/00* (2006.01)

(58) Field of Classification Search
CPC ......... A62B 1/04; A62B 1/06; A62B 35/0068; F16B 45/00
See application file for complete search history.

(56) References Cited

U.S. PATENT DOCUMENTS

| | | | |
|---|---|---|---|
| 6,520,290 B1 * | 2/2003 | Carter | A62B 35/0062 182/36 |
| 2002/0189898 A1 | 12/2002 | Campbell | |
| 2003/0015372 A1 * | 1/2003 | Herrmann | A62B 35/0068 182/186.7 |
| 2003/0155180 A1 * | 8/2003 | Liew | E04G 7/14 403/385 |
| 2005/0019095 A1 * | 1/2005 | Liew | E04G 7/14 403/218 |

FOREIGN PATENT DOCUMENTS

| | | | | |
|---|---|---|---|---|
| EP | 1240397 B1 | | 1/2007 | |
| GB | 2357542 | | 6/2001 | |
| GB | 2392950 | | 3/2004 | |
| GB | 2466460 | | 6/2010 | |
| GB | 2466460 A | * | 6/2010 | ............... A62B 1/04 |
| WO | WO200371048 | | 8/2003 | |
| WO | WO2010/72525 | | 7/2010 | |

\* cited by examiner

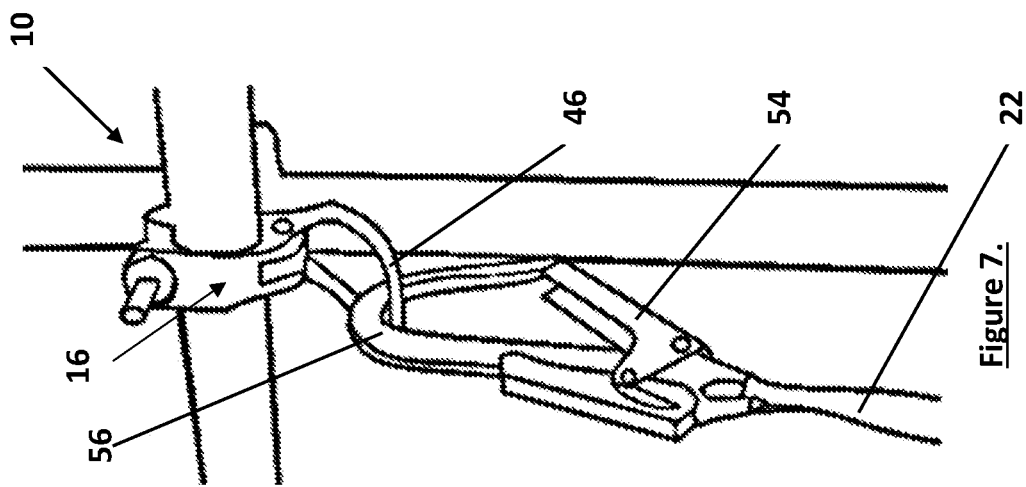
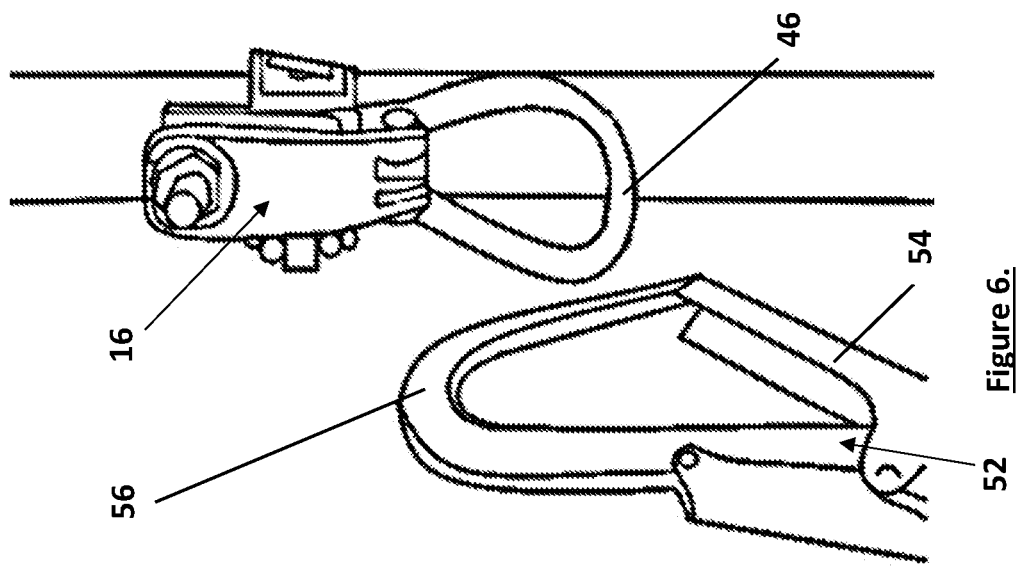
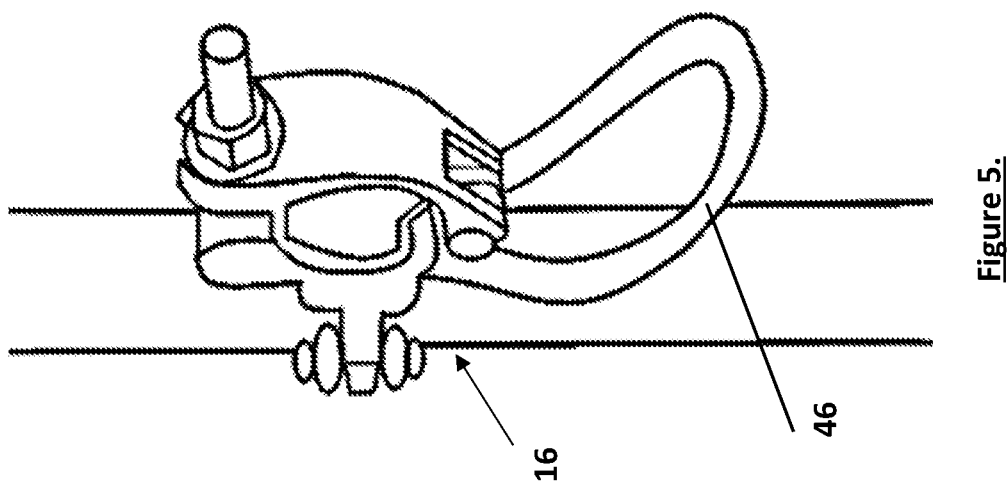

SCAFFOLDING SYSTEMS AND A SCAFFOLDING JOINT THEREFOR

CROSS-REFERENCE TO RELATED PATENT APPLICATIONS

The present application is a U.S. national stage application under 35 U.S.C. § 371 of PCT Application No. PCT/GB2019/000063, filed Apr. 25, 2019, which claims priority to United Kingdom Patent Application No. 1806789.2, filed Apr. 25, 2018. The disclosures of the aforementioned priority applications are incorporated herein by reference in their entireties.

This invention relates to scaffolding systems and assemblies as used on industrial and domestic and other building and repair and maintenance sites, and to a scaffolding joint for use in same.

More particularly the invention relates to safety systems for scaffolding assemblies and to methods and apparatus for providing improved safety for operatives and workers carrying out construction work in relation to the construction elements used in assembling such scaffolding systems both during the actual construction and assembly of the scaffolding itself and in relation to the subsequent building work to be carried out using the scaffolding structure.

Scaffolding systems have been provided to assist building construction for an extremely long time. The materials of such systems have changed over the years, and the systems for connecting together the longitudinal members of such systems have likewise changed over the years. But the likelihood of accidents occurring to operatives and workers carrying out building work on such systems have remained a significant limitation and concern to building contractors, and remain so to this day. Safety harnesses and safety lines connecting workers to the scaffolding system they are working on go back many years, and yet there remains a need for a simple and effective safety system that is convenient and simple for the operatives to employ, effective to limit the extent of any fall that might otherwise occur, and which does not impose unacceptable cost penalties.

Suffice it to say that existing systems to-date have not met the need for such a system due to limitations, in each case, in one or more of these respects. Yes, of course, in principle it is simple to anchor a safety harness in some way to a scaffolding framework so that an associated worker is safe from, or anyway at reduced risk of, falling. But it is necessary that the anchoring operation can be carried out quickly and easily and conveniently without interfering unduly with the other operations that the worker is required to perform in his or her capacity as building construction worker. And this in itself raises the need to provide the worker with ready access on the scaffolding framework as it is assembled, to locations for the attachment of safety harness-lines or ropes, and these must preferably have quick-attach and quick-detach operating characteristics.

Prior proposals for scaffolding safety systems have attempted to meet these requirements in various ways. For example, WO2010/72525 discloses a dedicated 'swivel end anchor of a fall-arrest system', but the single-purpose structure disclosed imposes on the user the requirement to provide sufficient of these 'anchors' throughout a scaffolding structure for the worker to be able to work safely as he moves about the structure in the course of the working day.

GB 2392950 likewise discloses a dedicated safety clamp for clamping to a scaffolding pole to provide a self-locking mounting for a fall-arrest system, but which is subject to the same limitation in relation to provision of sufficient of these mountings within a scaffolding structure, not to mention the need for these to be chosen and conveniently-available to the operatives constructing the scaffolding during its construction phase.

Likewise, WO200371048 discloses a complex scaffolding joint member or coupling for three mutually-perpendicular scaffolding poles, perfectly suitable for use with the above mentioned safety systems, but which would require, during the assembly phase of the scaffolding itself, the construction worker to intermix these different types of hardware at the appropriate rate or frequency as construction proceeds so that the necessary number of attachment locations are provided. We have realised that the need to use two or more types of hardware clamps or joints during construction of scaffolding leads to mistakes and complications and unacceptable costs and we have sought a way to avoid or reduce this problem.

GB2357542 grapples with the identical problem and proposes the provision of a safety chain on the scaffolding, to which the scaffolder is attached by a slideable ring attached to a safety harness. A complex and expensive solution to the problem.

An object of the invention is to provide improvements in or relating to the matters discussed above, or generally.

According to the invention there is provided a scaffolding joint for use in a scaffolding assembly, and a scaffolding assembly incorporating a plurality of said scaffolding joints, as defined in the accompanying claims.

By providing a simplified scaffolding joint which is able simultaneously to clamp two or more scaffolding members or poles as part of a scaffolding assembly and which is able also to provide safety connection means such as hooking means to receive a safety hook or the like, the embodiments of the invention disclosed herein simultaneously solve the twin-problems of simplicity and effectiveness discussed above. The same joint provides both the mounting and the safety functions, so no element of choice is needed in selecting a joint during the scaffolding construction phase, and each and every joint of the scaffolding offers a safety harness connection point in the post-scaffolding-construction-phase, whereby no element of search is require of an operative seeking to secure his or her harness at any moment because all the scaffolding joints around him/her provide that function.

In an embodiment there is provided a simplified scaffolding joint for securing two or more scaffolding members or poles at right angles or other relative angular disposition as part of a scaffolding assembly. In the disclosed scaffolding joint there is a common body member to which both said poles are clamped by respective movable clamping members. The common body member serves also as a mounting for a safety hook member which, in use, projects laterally of the associated adjacent scaffolding longitudinal. Thus, the safety hook member projects towards an operative working in relation to or near to that longitudinal, to receive a complementary safety hooking member at the end of a safety line or attached to a safety harness.

By simplifying the scaffolding joint of the embodiments, we have enabled its functions to be significantly expanded, in the sense that it is able, itself to perform additionally the function of safety connector, because its body member, which lies between the two scaffolding members or poles connected together by the joint, can provide a base or mounting for the safety hook member, which, by mere choice (by the operative) of its appropriate orientation during assembly of the scaffolding, can project laterally of the associated adjacent scaffolding longitudinal, and thus towards an operative working in relation to that longitudinal, to receive a safety tension member from that operative's safety harness or the like. The multi-task scaffolding joint of the described embodiments simplifies scaffolding construction operations by eliminating the need for separate supplies of scaffolding joints and safety connectors, and enables the operative subsequently easily to connect his safety line to any of the scaffolding joints of the assembly—a concept not previously contemplated as a possibility.

Embodiments of the invention will now be described by way of example with reference to the accompanying drawings in which:

FIGS. 5, 6 and 7 show perspective views of an embodiment, illustrating the sequence of steps for connecting an operative's safety line or harness to the scaffolding joint.

Figure 1:
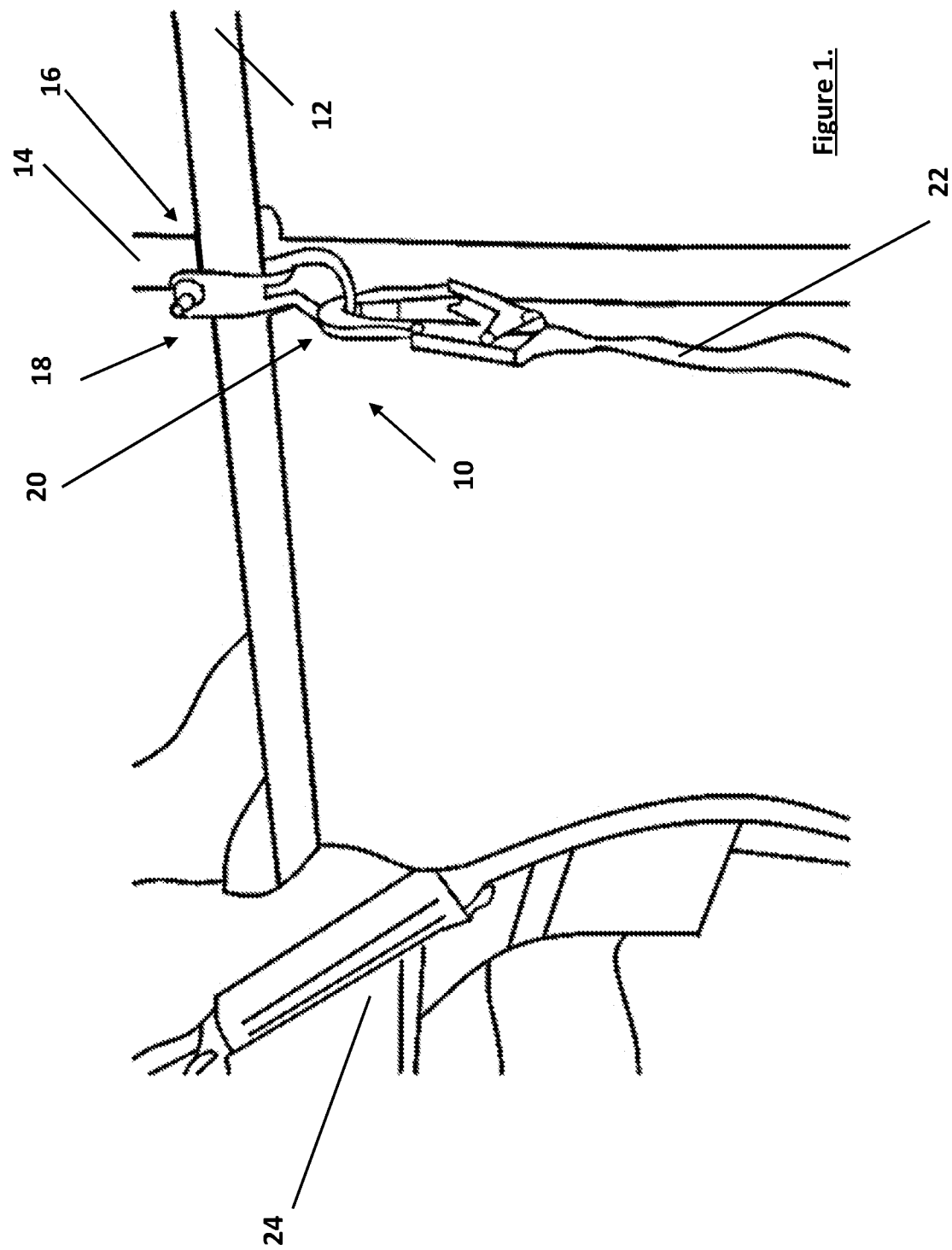
FIG. 1 shows a general perspective view of an embodiment of the invention in use in a scaffolding assembly with an operative working on the assembly shown connected thereto by a safety line.

As shown in FIG. 1 of the drawings, a scaffolding assembly 10 comprises a plurality of scaffolding poles (often referred to as tubes) 12, 14 and a plurality of scaffolding joints (often referred to as fittings) 16 releasably-securing the poles at cross-over points (often referred to as nodes) 18 in the scaffolding assembly.

In FIG. 1, the scaffolding assembly 10 can be seen to comprise the usual combination of horizontal poles 12, and vertical poles 14, with the scaffolding joints 16 holding these in rigid assembly. Such an assembly is used in many different ways in combination with walkways (not shown) to support operatives or workers thereon, both during the phase of initial construction of the scaffolding framework, usually from the ground upwards, and in the subsequent phase of building construction or repair or maintenance, whether domestic or business. It is to be understood that poles 12 and 14 may be of any suitable format, including that of rod, bar, baton, staff, shaft, strut, tube and rail, as well as pole-form, providing suitability for the work in question. Any change in format may have minor effects on the necessary design or format of the complementary scaffolding joints, particularly of the clamping and other members thereof which physically engage these 'poles or the like' longitudinal members.

The scaffolding assembly 10 further comprises a number of spaced safety connection points 20 for attachment and release of safety tension members 22 to connect operatives or workers or staff 24 to said assembly 10 during work, only one such connection point 20 being shown in FIG. 1 in terms of its construction, but it being understood that each and every crossover point 18 is provided accordingly.

Figure 2:
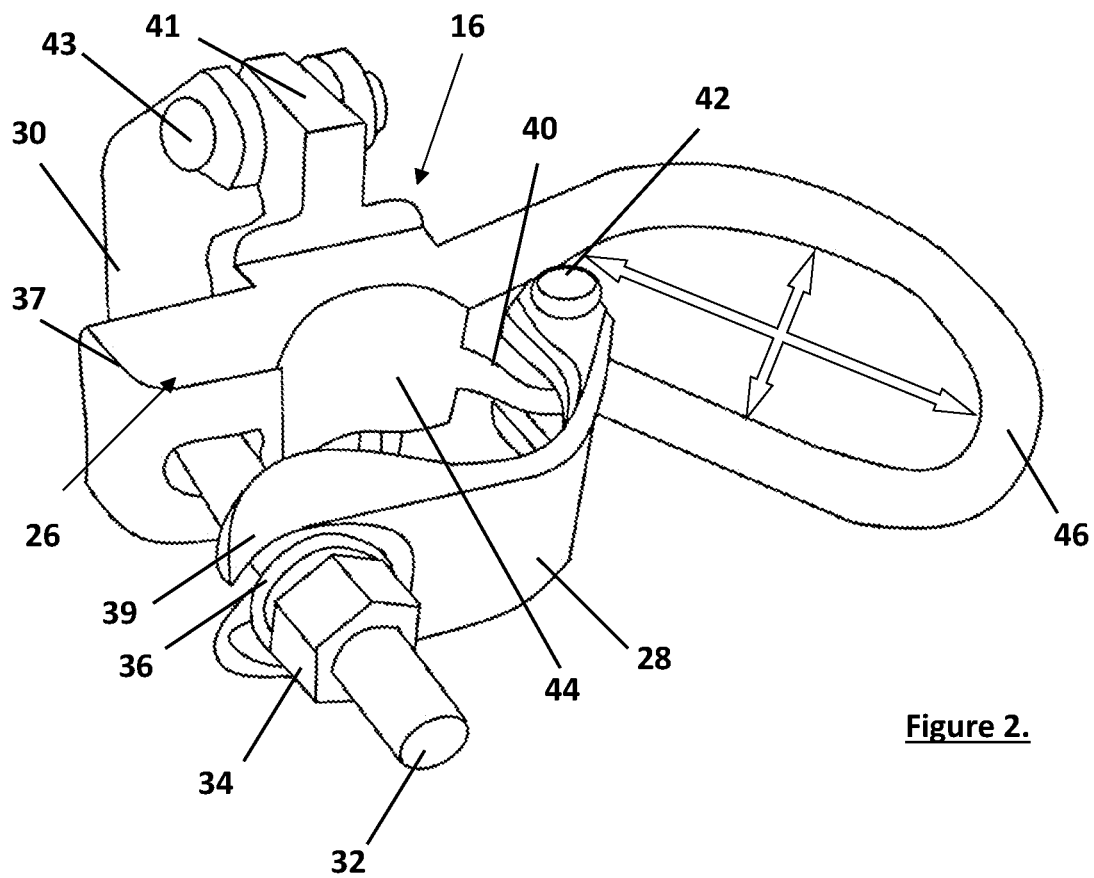
FIGS. 2 and 4 show perspective views of the FIG. 1 embodiment of the invention as seen from two different angles of view, and on a slightly larger scale than that of FIG. 1.

The scaffolding joints 16 are each formed as an assembly of three main pivotally-connected drop-forged members linked together by a pair of screw-threaded tension rods having corresponding tensioning-and-clamping nuts. Thus, as shown in FIG. 2, each joint 16 comprises a drop-forged inner body member 26 and two pivotable drop-forged outer clamping members 28, 30 to clamp the scaffolding poles 12, 14 to the inner body member 26 of the assembly 16 at the cross-over points 18. A pair of actuating tension rods 32, 33 and associated threaded nuts 34 and washers 36 extend outwardly from drop-forged mountings 37, 38 formed integrally at one end and one side (respectively) of inner body member 26, for the rods 32, 33 to be received in first bifurcated ends 39 of the clamping members 28, 30 to enable the necessary clamping action to be effected on the scaffolding poles to be mounted. At their other ends, the clamping members 28, 30 are also bifurcated to pivotally receive mounting flanges 40, 41 (and complementary pivot pins 42, 43) formed (by drop-forging) at the other end and the other side (from the rods 32, 33) of the inner body member 26 for actuating pivotal clamping movement. A pair of outwardly-facing concave scaffolding pole-face-receiving surfaces 44 (only one of these surfaces is actually visible in the views of FIGS. 3 and 3) are formed on the opposite sides of inner body member 26, complementing the corresponding inwardly-facing concave surfaces provided on clamping members 28, 30. The pivot pins 42, 43 define respective hinge axes parallel to the longitudinal axes of the scaffolding poles clamped by the respective clamping members.

Thus, significant aspects of the simple construction of inner body member 26, are the integral spaced pivotal mountings on its opposite sides for the outer clamping members, the correspondingly spaced integral mountings for the actuating rods, and the concave formations to receive the scaffolding pole surfaces so that the body member 26 is clamped between the poles.

Inner body member 26 further serves as a mounting for a safety connection member 46 which, in use, projects laterally of the associated adjacent scaffolding poles, 12, 14 in FIG. 1, and thus towards an operative 24 working in relation to or near that longitudinal, to receive and connect to a safety tension member 22 from said operative, whereby a safety connection point 20 of said scaffolding assembly is available at each of the scaffolding joints 16.

As can be seen in FIGS. 1 and 2, the safety connection member 46 provided by scaffolding joint 16 is in the form of a safety hook member which, in use, projects laterally of the associated adjacent scaffolding poles 12 and 14. Moreover, the safety hook member is of generally rounded loop-shaped format and extends from one end of the inner body member 26 at from 30 to 60 degrees, and in this embodiment at 45 degrees, with respect to the longitudinal-extent of said scaffolding pole.

As regards the dimensions of safety connection or hook member 46, its rounded-shape width and length (as measured across its major dimensions) are approximately one to one-and-a-half times (width) and twice to three times (length) the diameter of the adjacent scaffolding pole with which the joint 16 is designed to work with.

Figure 3:
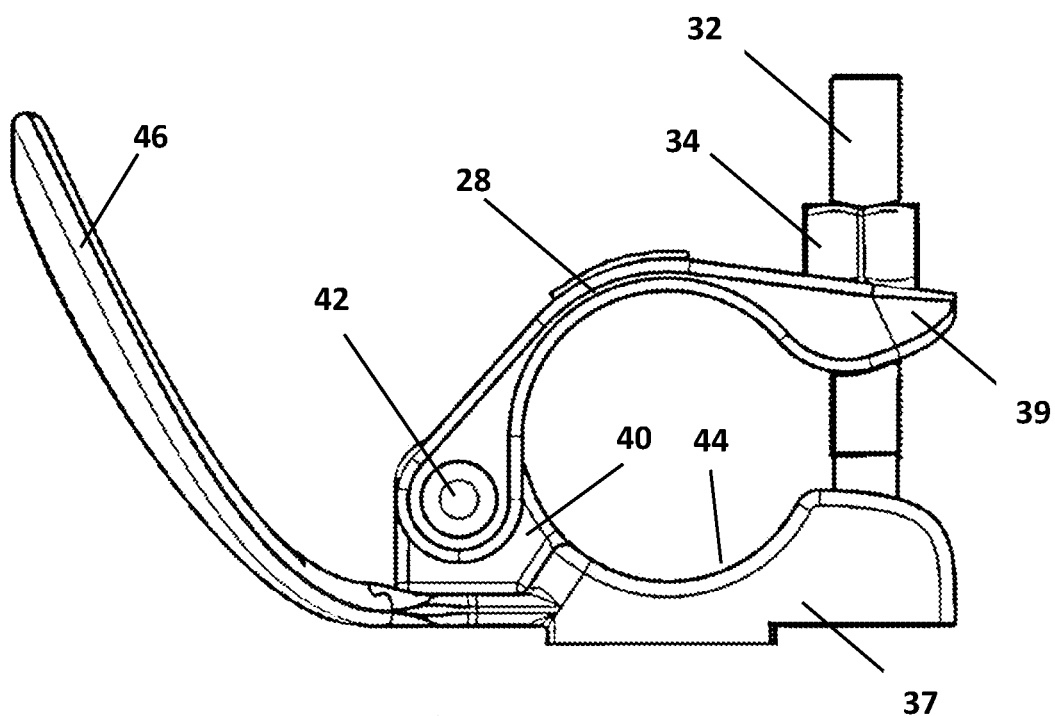
FIG. 3 shows a side view of a portion of the embodiment of FIG. 1.

As shown in FIGS. 2 and 3, the safety connection or hook member 46 is formed integrally with the inner body member 26 of scaffolding joint 16. The combined structure is conveniently formed by drop-forging at the same time as the other formations on the inner body member are likewise formed.

In use, a scaffolding assembly comprising multiple scaffolding poles 12, 14 is constructed by operatives using a supply of the scaffolding joints 16 without the need to have on-hand any other type or design of scaffolding joint. The mode and sequence of assembly is unchanged from previous practice so far as use of the scaffolding joints 16 to interconnect the poles at crossover points 18 is concerned. However, so far as concerns providing an operative with an anchor or mounting for his safety line during the construction of the scaffolding assembly and during subsequent building, repair or maintenance, the position is extremely favourable because the scaffolding joints 16 provide a safety connection or hook member 46 at every joint or crossover point, whereby whatever an operative wants to do and wherever he or she wishes to work, the safety connection aspects of the operation are simplified.

Figure 4:
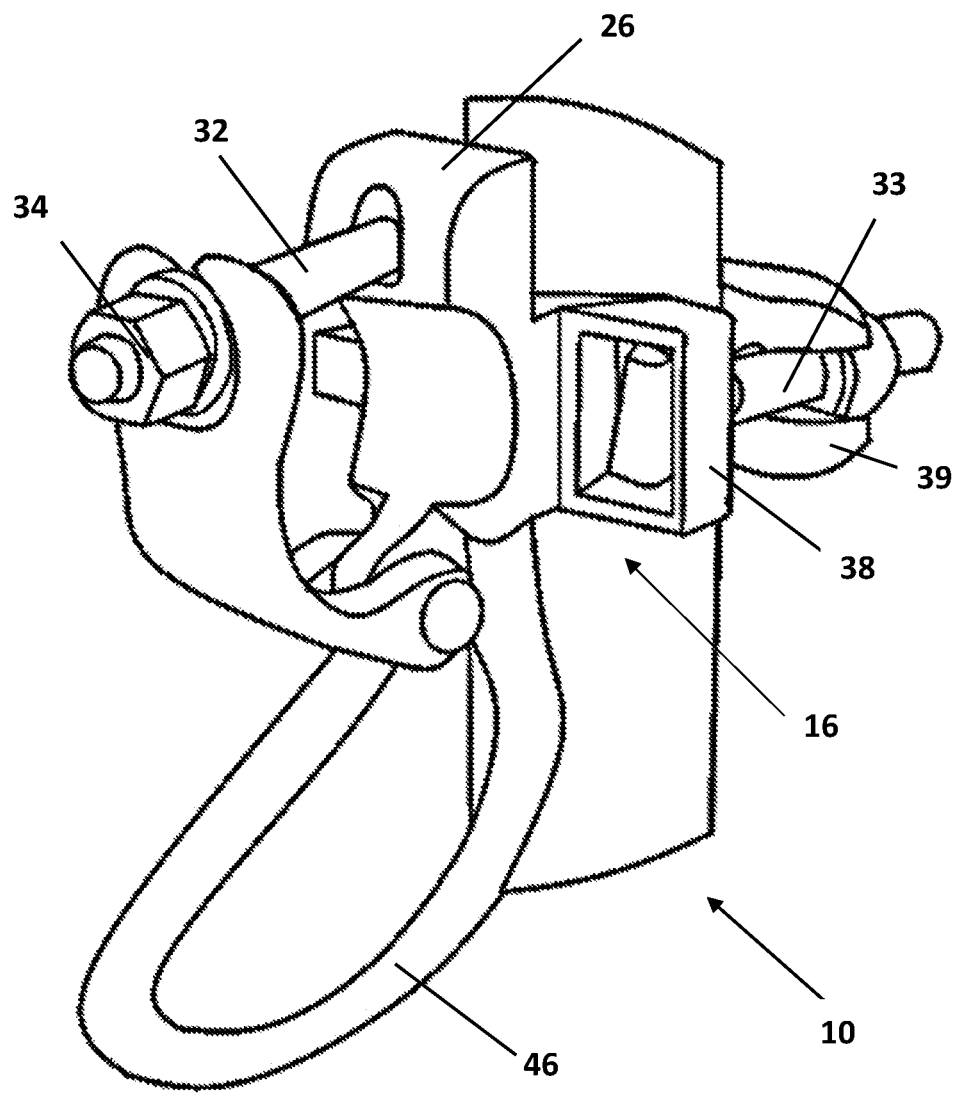

FIGS. 4, 5 and 6 illustrate the safety line connection steps in use. FIG. 4 shows a joint 16 of a scaffolding assembly ready to receive an operative's safety line. The availability of the safety connection or hook member 46 is readily apparent. FIG. 5 shows an end connector 52 of a safety line, said end connector being of generally hook-shaped format, having a spring-biased jaw member 54 permitting a snap-fit connection action when operative 24 offers the connector up to hook member 46 as shown in FIG. 5 and causes said jaw member to open against said spring bias, thereby permitting the fixed end part 56 of said end connector to hook-connect to said safety connection member 46, as shown in FIG. 6, whereupon the operative is securely connected to the scaffolding framework and can move safely about the framework to perform the necessary work.

An illustration of a situation where the present invention is particularly advantageous is set out below. Where scaffolding is being built vertical poles are added and then horizontal rails are attached to the vertical poles. In the prior art the advised safety procedure for adding a top rail is as follows. A standard joint fitting (of the prior art) is added to the vertical pole at the required height (approximately 2 m for the next level of the scaffolding) and a hook connector 52 of the safety tension member 22 is hooked around the vertical pole above the joint fitting. In the event of a fall it is the joint fitting which prevents the operative from falling as it stops the hook connector 52 from sliding down the vertical pole. However, this is not ideal as the safety tension member 22 is acting on the hook connector 52 transverse to the correct and strongest pulling direction and this can result in the hook becoming damaged or bent. Furthermore, when adding a horizontal pole, which can be as long as 23 ft (7 m) and weigh 6 st (almost 40 kg) an operative lifts the pole vertically hand over hand until they have reached approximately the halfway point. At this position (known as the break point) the weight of the pole is balanced roughly at the centre allowing the operative to rotate it from being vertical to the horizontal position so that it can be attached to the joint 16. However, to lower the pole into place the hook connector 52 must be detached from the vertical pole as it is located above the joint 16 and therefore the safety tension member is in the way preventing the pole from connecting to the joint. In order to do this the operative must let go of the pole with one hand to unclip the hook connector therefore holding the pole only with their other hand. The hook connector 52 is then passed under the pole and reconnected to the vertical pole above the joint 16. The pole can then be fixed to the scaffolding assembly by clamping into the joint 16. This manoeuvre is particularly difficult and dangerous because of the need to let go of the pole with one hand.

In the present invention the same manoeuvre can be completed without the need to let go of the pole. Because the hook connector is attached to the scaffolding assembly at the safety connection member 46 which is located below the clamping member 28 the pole can be placed into engagement with the inner body member 26 and the clamping member 28 without interfering with the safety connection member 22 or the hook connector 52. There is therefore no need to let go of the pole with one hand when moving it into position. Furthermore, because the safety connection member 26 is in the form of a loop, the hook connector 52 of the safety connection member 22 is always acting in the correct direction in the event of a fall.

Figure 8:
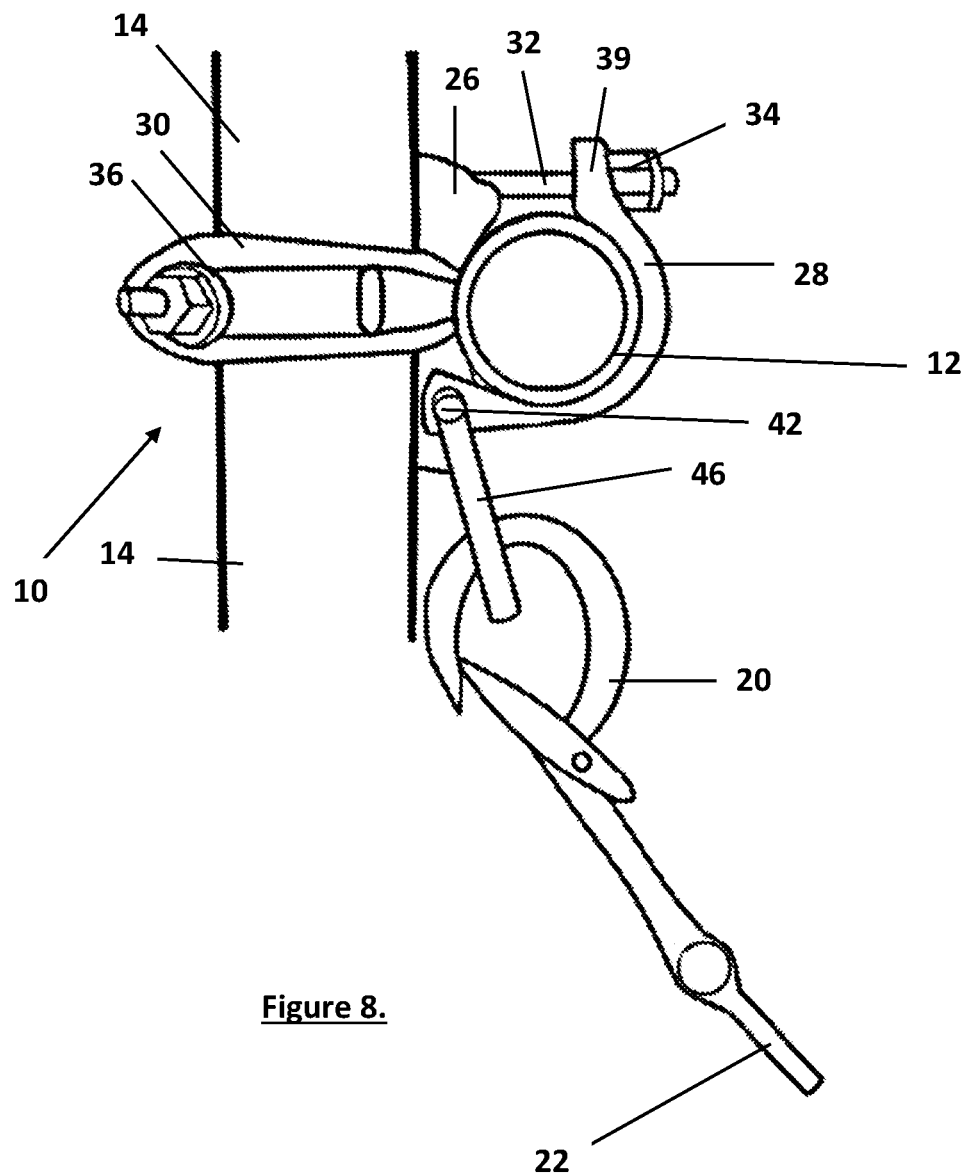
FIG. 8 is a side view of an alternative embodiment of the invention.

It will be appreciated by persons skilled in the art that the above embodiments have been described by way of example only and not in any limitative sense, and that various alterations and modifications are possible without departure from the scope of the protection which is defined by the appended claims. For example, in an alternative embodiment, shown in FIG. 8, the safety connection or hook member, otherwise formed similarly to the member 46 described and illustrated above, is pivotally connected to the main body of said scaffolding joint, and adopts approximately the same laterally projecting (at 30 to 60 degrees, preferably 45 degrees) attitude with respect to the adjacent scaffolding longitudinal in use when connected to an operative's lanyard.

The invention claimed is:

1. A scaffolding joint for use in a scaffolding assembly, said scaffolding joint comprising:
   an inner body member;
   a first movable outer clamping member and a second movable outer clamping member to clamp scaffolding poles of a scaffolding assembly to said inner body member at cross-over points of a vertical scaffolding pole and a horizontal scaffolding pole of said scaffolding assembly, said inner body member and said movable outer clamping members in use engaging said scaffolding poles to form the scaffolding joint with said inner body member engaging both said vertical and horizontal scaffolding poles and the first movable outer clamping member engaging said vertical scaffolding pole and the second movable outer clamping member engaging said horizontal scaffolding pole; and
   a safety connection member, wherein said inner body member serves as a mounting for said safety connection member, said safety connection member configured to connect to a safety tension member from a scaffolding safety appliance, wherein said safety connection member is of monolithic construction with said inner body member and said safety connection member comprises a safety loop member which projects laterally of and below said second movable outer clamping member, from one of:
   said inner body member; and
   a pivot connecting said second movable outer clamping member to said inner body member, whereby a safety connection point of said scaffolding assembly is available at said scaffolding joint.

2. A scaffolding joint according to claim 1 wherein said inner body member comprises integral spaced pivotal mountings for said first and second movable outer clamping members and correspondingly-spaced integral mountings for actuating rods connected to said first and second movable outer clamping members, and formations to receive the vertical and horizontal scaffolding pole surfaces so that the inner body member is clamped between the vertical and horizontal scaffolding poles.

3. A scaffolding joint according to claim 1 wherein said safety connection member is pivotally connected to the inner body member of said scaffolding joint and configured to adopt a laterally projecting attitude with respect to an adjacent scaffolding longitudinal.

4. A scaffolding joint according to claim 1 in combination with a safety line having an end connector adapted to connect-to and disconnect-from said safety connection member of said scaffolding joint in a quick-connect-disconnect manner.

5. A scaffolding joint according to claim 4 wherein said end connector of said safety line is hook-shaped, having a spring-biased jaw member permitting a snap-fit connection action upon an opening of said jaw against said spring bias, thereby permitting a fixed part of said end connector to hook-connect to said safety connection member.

6. The scaffolding joint of claim 1 wherein said scaffolding safety appliance is at least one of a fall arrester, safety line, lanyard or safety harness.

7. A scaffolding assembly comprising
a plurality of scaffolding poles including vertical and horizontal scaffolding poles, and
a plurality of scaffolding joints, said scaffolding joints comprising:
an inner body member;
a first movable outer clamping member and a second movable outer clamping member to clamp scaffolding poles of a scaffolding assembly to said inner body member at cross-over points of a said vertical scaffolding pole and a said horizontal scaffolding pole, said inner body member and said movable outer clamping members configured to engage said scaffolding poles to form the scaffolding joint with said inner body member engaging both said vertical and horizontal scaffolding poles and the first movable outer clamping member engaging said vertical scaffolding pole and the second movable outer clamping member engaging said horizontal scaffolding pole; and
a safety connection member, wherein said inner body member serves as a mounting for said safety connection member, said safety connection member configured to connect to a safety tension member from a scaffolding safety appliance, wherein said safety connection member is of monolithic construction with said inner body member and said safety connection member comprises a safety loop member which projects laterally of and below said second movable outer clamping member, from one of:
said inner body member; and
a pivot connecting said second movable outer clamping member to said inner body member whereby a safety connection point of said scaffolding assembly is available at each of said scaffolding joints.

8. A method of providing a safety system for a scaffolding assembly comprising using a plurality of scaffolding joints to interconnect scaffolding poles at crossover points in said assembly, comprising the steps:
erecting vertical scaffolding poles;
attaching a scaffolding joint of said plurality of scaffolding joints to a said vertical scaffolding pole;
wherein said scaffolding joint comprises:
an inner body member;
a first movable outer clamping member and a second movable outer clamping member to clamp scaffolding poles of a scaffolding assembly to said inner body member at cross-over points of a vertical scaffolding pole and a horizontal scaffolding pole of said scaffolding assembly, said inner body member and said movable outer clamping members in use engaging said scaffolding poles to form the scaffolding joint with said inner body member engaging both said vertical and horizontal scaffolding poles and the first movable outer clamping member engaging said vertical scaffolding pole and the second movable outer clamping member engaging said horizontal scaffolding pole; and
a safety connection member, wherein said inner body member serves as a mounting for said safety connection member, said safety connection member configured to connect to a safety tension member from a scaffolding safety appliance, wherein said safety connection member is of monolithic construction with said inner body member and said safety connection member comprises a safety loop member which projects laterally of and below said second movable outer clamping member and is fixed to an in use projecting laterally, with respect to the longitudinal extent of the scaffolding pole, from one of:
said inner body member; and
a pivot connecting said second movable outer clamping member to said inner body member whereby a safety line can be connected by an operative at any such joint during work,
attaching a safety tension member to said safety connection member; and
attaching said horizontal scaffolding pole to said scaffolding joint such that said horizontal scaffolding pole is above said safety connection member.

* * * * *